(12) United States Patent
Hill et al.

(10) Patent No.: US 9,032,911 B2
(45) Date of Patent: May 19, 2015

(54) LEASH ASSEMBLY AND METHOD FOR COUPLING MULTIPLE DOGS

(76) Inventors: Franklin G. Hill, Deerfield Beach, FL (US); Michelle G. Hill, Deerfield Beach, FL (US)

( * ) Notice: Subject to any disclaimer, the term of this patent is extended or adjusted under 35 U.S.C. 154(b) by 384 days.

(21) Appl. No.: 13/309,296

(22) Filed: Dec. 1, 2011

(65) Prior Publication Data

US 2013/0139764 A1 Jun. 6, 2013

(51) Int. Cl.
*A01K 1/04* (2006.01)
*A01K 27/00* (2006.01)

(52) U.S. Cl.
CPC .................................... *A01K 27/003* (2013.01)

(58) Field of Classification Search
CPC ............................... A01K 1/04; A01K 27/003
USPC .................................. 119/769, 795, 797, 799
See application file for complete search history.

(56) References Cited

U.S. PATENT DOCUMENTS

| | | | | |
|---|---|---|---|---|
| 4,879,972 A * | 11/1989 | Crowe et al. | ................. | 119/792 |
| 4,892,063 A | 1/1990 | Garrigan | | |
| 5,080,045 A * | 1/1992 | Reese et al. | ................... | 119/795 |
| D337,396 S * | 7/1993 | Werner | ....................... | D30/153 |
| 5,551,379 A * | 9/1996 | Hart | ............................. | 119/771 |
| 5,632,234 A | 5/1997 | Parker | | |
| 5,718,190 A * | 2/1998 | Tinker | .......................... | 119/771 |
| 5,813,368 A * | 9/1998 | Rasmussen | ................... | 119/799 |
| 6,247,428 B1 * | 6/2001 | Mireles | ......................... | 119/795 |
| 6,273,029 B1 * | 8/2001 | Gish | ............................. | 119/792 |
| 6,932,027 B1 * | 8/2005 | Whitney | ....................... | 119/770 |
| 7,096,827 B2 * | 8/2006 | Sporn | ........................... | 119/797 |
| 7,662,073 B1 * | 2/2010 | Baldwin | ......................... | 482/92 |
| 7,726,261 B2 * | 6/2010 | Everhart | ....................... | 119/795 |
| 7,757,639 B1 * | 7/2010 | Prendes | ....................... | 119/772 |
| D685,143 S * | 6/2013 | Hess | ............................ | D30/153 |
| 2007/0215065 A1 * | 9/2007 | Furlich | ......................... | 119/795 |
| 2010/0050957 A1 * | 3/2010 | Elkins et al. | .................. | 119/793 |
| 2011/0139089 A1 * | 6/2011 | Spritzer et al. | ................ | 119/770 |
| 2012/0037092 A1 * | 2/2012 | Sells | ............................. | 119/795 |
| 2013/0133592 A1 * | 5/2013 | Church | ......................... | 119/795 |
| 2013/0167782 A1 * | 7/2013 | Poch | ............................. | 119/795 |
| 2014/0007818 A1 * | 1/2014 | Cheng | .......................... | 119/792 |

OTHER PUBLICATIONS

Hammacher Schlemmer—The Tangle Free Dual Dog Leash http://www.hammacher.com/Product/79905?cm_ven_HS&cm_cat-ProductSEM&cm_pla=AdWo . . . Jul. 6, 2011.
KeepDoggieSafe.com—Couplers and Triplers—Easily walk two or three dogs with one Leash http://keepdoggiesafe.com/couplers.html?gclid=CKidoZ_KakCFcjr7QodtnY4Xw Jul. 6, 2011.

(Continued)

*Primary Examiner* — Monica Williams
(74) *Attorney, Agent, or Firm* — The Concept Law Group, P.A.; Scott D. Smiley; Erin A. Martin

(57) ABSTRACT

A dog leash assembly includes (1) an elongated handle portion, (2) a first leash adapter coupled to the first end of the handle portion and having a first leash connector, and (3) a second leash adapter coupled to the second end of the elongated handle portion and a second leash connector, the second leash connector being removably couplable to the first leash connector. A first collar coupling member has a first end that is removably couplable to the first leash connector and/or the second leash connector a second end with a first collar connector that is removably couplable to a dog collar.

20 Claims, 8 Drawing Sheets

(56) References Cited

OTHER PUBLICATIONS

PetExpertise.com—Xtreme Two Dog Shock Absorbing Leash http://www.petexpertise.com/dog-leashes-lines-and-couplers/two-dog-shock-absorbing-leash.html Jul. 6, 2011.

Ceasarsway.com Dog Whisperer Training Lead http://www.cesarsway.com/shop/Dog-Whisperer-Training-Lead Jul. 20, 2011.
LarzEquipment.com Dog Leashes, collars, and Harnesses http://larzequipment.com/ Jun. 25, 2012.

* cited by examiner

LEASH ASSEMBLY AND METHOD FOR COUPLING MULTIPLE DOGS

FIELD OF THE INVENTION

The present invention relates generally to dog restraining apparatuses, and more particularly relates to a dog leash with the capability of simultaneously restraining multiple dogs and at varying lengths from the user.

BACKGROUND OF THE INVENTION

Dog leashes are utilized by owners/operators of dogs for the safety, convenience, and health of their pets. Dogs leashes are primarily designed to control the mobility of dogs while being walked, preventing them from straying off or to direct the path in which they walk. The obvious benefits of walking dogs also include giving them an opportunity to exercise, interact with other dogs and the environment, and allowing dogs the necessary act of relieving themselves. A majority of known dog leashes are designed for the operation and control of one dog. Those leashes are disadvantageous for those owners/operators or facilities that own, or have in their custody, more than one dog that needs to be controlled while being walked.

Known dog leashes generally have a handle and one or more leashes with a clasp at the end to attach to a dog. Many owners with multiple dogs are required to buy more than one leash for their dogs and walk them with two hands, or hold all of the leashes with one hand. Those known dog leashes adaptable for multiple dogs have handles that are generally pliable, in that the handle forms around the shape of a person's hand, disadvantageously, not giving the owner/operator the ability to control certain dogs that are connected on the leash. Moreover, the leashes are generally a predetermined length and permanently coupled to the handle, not allowing for an owner/operator to attach more than one leash in correspondence to the amount of dogs he or she owned/operated. Few, if any, known dog leashes give the owner/operator the ability to control certain dogs of different weights and heights with the same handle and at the same time. Few, if any, known dog leashes have the ability for the owner/operator to interchange the number of leashes. Having that convenience is specifically advantageous for persons in the profession of walking dogs or working in an animal facility, such as shelters or veterinarian offices, that have a need for walking multiple dogs in their custody.

Known dog leashes that have one or more leashes attached to the handle generally originate at a central point, or at points so close to each other, such that it does not give the owner/operator the ability to transmit a signal to one dog on the leash without also transmitting the signal to one of the other dogs being walked. Therefore, the owner/operator must correct or control all of the dogs attached on the leash. For example, if there were more than one dog on the leash and one or more of the dogs were lagging behind or needed to be corrected, with the known prior-art leashes, an owner can only pull both dogs' leashes together, rather than only correcting the dog that needs correction. This is disadvantageous for users controlling more than one dog. It is also disadvantageous for those owners/operators that own more than one dog that are trying to efficiently walk his or her dogs and at the same time trying to correct or discipline those dogs that have not be trained, sending mixed messages to those dogs that do not need to be corrected, adjusted, or disciplined.

Although there are known dog leashes that have more than one leash, those leashes do not allow the owner to have that ability to selectively control one dog and not another. The known leashes also do not have the flexibility of interchanging leashes depending on the strength or height of the dog. Many owners/operators have dogs of different heights and strengths and those known dog leashes with multiple leashes for multiple dogs do not have the ability to adapt or adjust the leashes depending on the dog's characteristics, mixing and matching the correct leash as needed. Those known multiple dog leashes are generally sold with pre-determined lengths or a set amount of leashes, limiting the leash's ability to adapt to a growing dog and the addition or subtraction of dogs desired to be walked, which is disadvantageous to owners/operators of said dogs. Lastly, there exist known dog leashes with multiple leashes that are retractable or adaptable to certain dogs, but said leashes are generally limited to a certain amount of leashes permanently affixed on the handle, still do not give the owner/operator the ability to control certain dogs on the leash, and are generally more costly.

Therefore, a need exists to overcome the problems with the prior art as discussed above.

SUMMARY OF THE INVENTION

The invention provides a dog leash assembly and method of use that overcomes the hereinafore-mentioned disadvantages of the heretofore-known devices and methods of this general type and that provides a leash to simultaneously control/communicate with one or any number of dogs. The user of the inventive dog leash assembly, for the first time, now has the ability to selectively control or correct certain dogs attached to the inventive dog leash while not correcting other dogs attached to the leash.

With the foregoing and other objects in view, there is provided, in accordance with the invention, a dog leash that includes an elongated handle portion having a first end and a second end, opposite to the first end. A first leash adapter is also included, which has a first end, coupled to the first end of the elongated handle portion, a second end, and a first length separating the first end and the second end of the first leash adapter. Also included is a first leash connector at the second end of the first leash adapter. A second leash adapter, which is included, features a first end coupled to the second end of the elongated handle portion, a second end, a second length separating the first end and the second end of the second leash adapter, and a second leash connector at the second end of the second leash adapter. The second leash connector is removably couplable to the first leash connector. A first collar coupling member features a first end with a first coupler being removably couplable to at least one of the first leash connector and the second leash connector. The first coupling members also features a second end with a first collar connector that is removably couplable to a first dog collar and a third length separating the first end from the second end of the first collar coupling member.

In accordance with another feature, an embodiment of the present invention also includes a second collar coupling member that has a first end with a second coupler being removably couplable to at least one of the first leash connector and the second leash connector. The second collar coupling member also has a second end with a second collar connector that is removably couplable to a second dog collar. Also featured is a fourth length separating the first end from the second end of the second collar coupling member with the fourth length being different from the third length.

In accordance with another feature, an embodiment of the present invention also includes a third collar coupling member that has a first end with a third coupler being removably couplable to the first leash connector and the second leash connector. The third collar coupling member also has a second end with a third collar connector that is removably couplable to a third dog collar. Also featured is a fifth length separating the first end from the second end of the third collar coupling member, the fifth length being different from at least one of the third and the fourth length.

In accordance with a further feature of the present invention, the first end of the elongated handle portion is separated from the second end of the elongated handle portion by at least three inches.

In accordance with a further feature of the present invention, the elongated handle portion, the first leash adapter, and the second leash adapter together form a triangular shape when the second leash connector is removably coupled to the first leash connector.

In accordance with an additional feature of the present invention, the first collar coupling member has a toggle adjuster disposed along and able to selectively define the third length.

In accordance with a further feature of the present invention, the first leash connector includes a portion that is rotatable with respect to itself.

In accordance with a further feature of the present invention, the first length of the first leash adapter is different from the second length of the second leash adapter.

In accordance with a further feature of the present invention, the first collar connector is disposed between the first coupler and a fastening coupler, the fastening coupler being removably couplable to at least one of the first leash connector and second leash adapters.

In accordance with the present invention, a method of coupling a dog to a leash handle, the method includes the steps of providing an elongated handle portion that includes a first end and a second end opposite to the first end, a first leash adapter that includes a first end coupled to the first end of the elongated handle portion, a second end, a first length separating the first end and the second end of the first leash adapter, and a first leash connector at the second end of the first leash adapter. The method further includes the step of providing a second leash adapter that includes a first end coupled to the second end of the elongated handle portion, a second end, a second length separating the first end and the second end of the second leash adapter, the second length being different from the first length, and a second leash connector at the second end of the second leash adapter, with the second leash connector being removably couplable to the first leash connector. The method further includes the step of providing a first collar coupling member that includes a first end with a first collar coupler being removably couplable to at least one of the first leash connector and the second leash connector, a second end with a first collar connector that is removably couplable to a first dog collar, and a third length separating the first end from the second end of the first collar coupler. The method yet further includes the step of providing a second collar coupling member that includes a first end with a second coupler being removably couplable to at least one of the first leash connector and the second leash connector, a second end with a second collar connector that is removably couplable to a second dog collar, and a fourth length separating the first end from the second end of the second collar coupling member, the fourth length being different from the third length. The method further includes the step of removably coupling the first collar coupling member to the first leash connector, disconnecting the second leash connector from the first leash connector, and removably coupling the second collar coupling member to the second leash connector.

In accordance with another feature of the present invention, the method of coupling a dog to a leash handle includes the step of coupling a first dog to the first collar connector, coupling a second dog to the second collar connector, and selectively delivering a correction to only one of the first dog and the second dog by tilting the elongated handle portion.

In accordance with yet a further feature of the present invention, the method of coupling a dog to a leash handle includes the step of providing a third collar coupling member. The third collar coupling member featuring a first end with a third coupler being removably couplable to the first leash connector and the second leash connector, a second end with a third collar connector that is removably couplable to a third dog collar, and a fifth length separating the first end from the second end of the third collar coupling member with the fifth length being different from at least one of the third and the fourth length. The method further includes a step of coupling the third collar coupling member to one of the first leash connector and the second leash connector.

In accordance with yet a further feature of the present invention, the method of coupling a dog to a leash handle includes the step of providing the elongated handle portion in a tubular shape.

Although the invention is illustrated and described herein as embodied in a leash for coupling multiple dogs, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the pliable leash adapters from the end which they are installed to elongated dog leash handle to the end of the coupling members attached to the dog collars.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
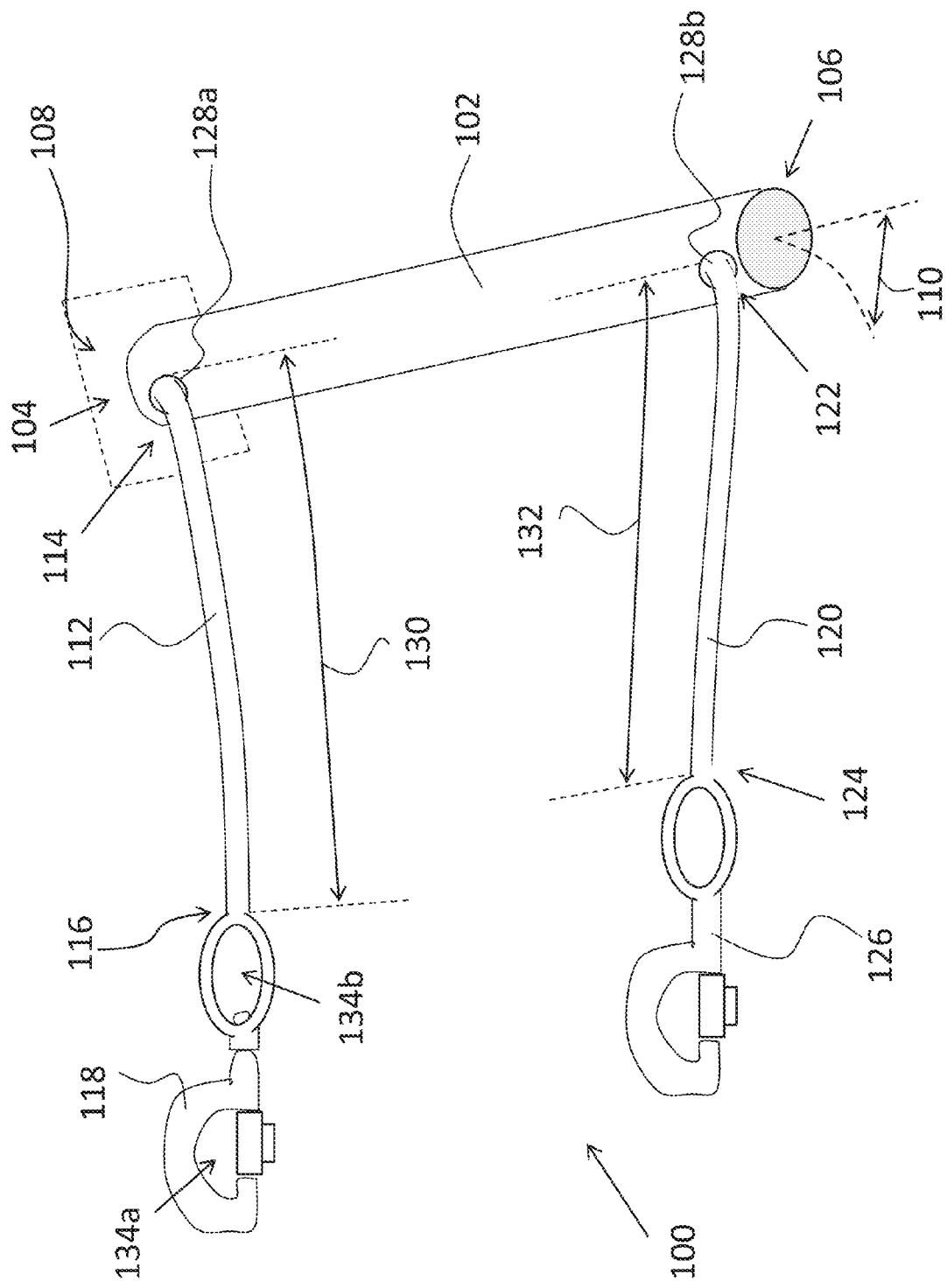
FIG. 1 is a perspective view of an elongated handle featuring pliable leash adapters of a dog leash assembly in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient dog leash that allows a user to control one to a multitude of dogs using one handle and to selectively apply corrections to certain dogs on the leash, while not correcting other dogs on the leash. Embodiments of the invention provide the user with a variety of connecting leashes or collar coupling members, ranging from one collar coupling members up to many collar coupling members, connecting said collar coupling members with very little effort. In addition, embodiments of the invention provide the user with the ability to selectively choose the amounts and lengths of collar coupler members used, depending on the size and strength of dogs the user desires to control.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. In the first embodiment of the present invention, the dog leash assembly 100 has an elongated handle portion 102, having a first end 104 and second end 106, opposite to the first end. The "end," unless otherwise stated below, is defined herein to mean a location at or approximately one to three inches away from a plane 108 containing the absolute end of a structure. In an embodiment of the present invention, the length separating the first end 104 and second end 106 of the handle portion 102 is approximately twelve inches, but is no less than approximately three inches. In other embodiments, the length of the handle portion 102 may vary as to length, but should be a length sufficient enough to fit three or four fingers, in order to control the dogs on the leash and use the invention, as described below. The length of the handle portion 102 is used to allow the user to make corrections to certain dogs on one side of the leash, without correcting the dogs on the other side of the leash. The handle length defines a gripping surface area extending from the first end 104 to the second end 106, the gripping surface area shaped to receive the palm of a user's hand on all sides thereof, allowing the user to selectively grip any point along the handle length to control one or more dogs coupled to the dog leash assembly 100. As illustrated in FIG. 1, the gripping surface area is free of any protruding members separating the handle length: thus, allowing the user to selectively grip along the handle length to control one or more dogs coupled to the dog leash assembly 100.

The elongated handle portion 102 of the dog leash assembly 100 allows the user to control one or more dogs connected thereto. In one embodiment of the present invention, the handle is tubular in shape, allowing for the hand of the user to contour grip the handle portion 102. The handle can be of a light-weight resilient material, such as hardened plastic, aluminum, or the like. The obvious benefit of having a lightweight material reduces the amount of weight the user has to hold. "Resilient" is defined herein as the ability to flex or adjust to exerted forces with permanent or temporary deformation from the original axial centerline 110, if any, of no more than about three and one-half inches from the original axial centerline 110 of the handle portion 102. In other embodiments, the elongated handle portion 102 is rectangular or triangular in shape or has grips for the user. The handle portion 102 is, however, not limited to any particular shape. Moreover, the handle portion 102 may have rubber, rope, or some other type of soft, cushioned, material covering the handle portion 102 so that the user may hold the handle portion 102 comfortably. The handle portion 102 is, however, not limited to any particular material.

Also seen in FIG. 1 is a first pliable leash adapter 112 having a first end 114, which is coupled to the first end 104 of the handle portion 102. The first pliable leash adapter 112 also has a second end 116 that is attached to a first leash connector 118. A second pliable leash adapter 120 is illustrated having a first end 122 coupled to the second end 106 of the handle portion 102. A second end 124 of the second pliable leash adapter 120 is attached to a second leash connector 126.

Having the first pliable leash adapter 112 and second pliable leash adapter 120 separated by a length of the handle portion 102 provides for a way to individually control/communicate to one or a few within a group of dogs attached to the handle portion 102. In one embodiment of the present invention, both the first end 114 of the first pliable leash adapter 112 and the first end 122 of the second pliable leash adapter 120 are coupled to the handle portion 102 of the dog leash assembly 100 by inserting the first pliable leash adapter 112 and second pliable leash adapter 120 into respective holes 128a-b at the end of the handle portion 102 and then tying said leash adapters 112, 120 into a knot, such that the width of the knot is bigger than the respective holes 128a-b they were inserted in. In other embodiments, the first pliable leash adapter 112 and the second pliable leash adapter 120 may be coupled to the handle portion 102 using ties, bolts, clasps, glue or other attaching mechanisms sufficient to withstand the forces created by the dogs.

In one embodiment of the present invention, the first pliable leash adapter 112 and second pliable leash adapter 120 are made out of a material that is pliable. "Pliable" as defined herein, means the ability of a material to bend repeatedly without breaking. In one embodiment, the first pliable leash adapter 112 and second pliable leash adapter 120 are made out of rope or chord. In other embodiments, said leash adapters are made from plastic, nylon, leather, chain, composites, or other suitable materials. The first pliable leash adapter 112 and second pliable leash adapter 120 provide the user with an efficient and easy means to correct and control certain dogs on either side of the elongated handle portion 102.

The first end 114 and second end 116 of the first pliable leash adapter 112 is separated by a first length 130. Similarly, the first end 122 and second end 124 of the second pliable leash adapter 120 is separated by second length 132. As illustrated in FIG. 1, the first length 130 and second length 132 are different from one another. The variation in length allows the leash adapters 112, 120 to be removably couplable to one another and to also be removably couplable to other leash attachments or coupling members. "Removably couplable" or "removably coupled" is defined herein having the ability to attach to and be removed from another object with little effort. As previously described, the presently inventive dog leash provides multiple leash attachments, or coupling members, depending on the number of dogs the user desires to control. With the first length 130 and second length 132 being different from each other, the dog leash assembly 100 can be easily converted from a dog leash assembly 100 that controls one dog, to any number of dogs.

Figure 2:
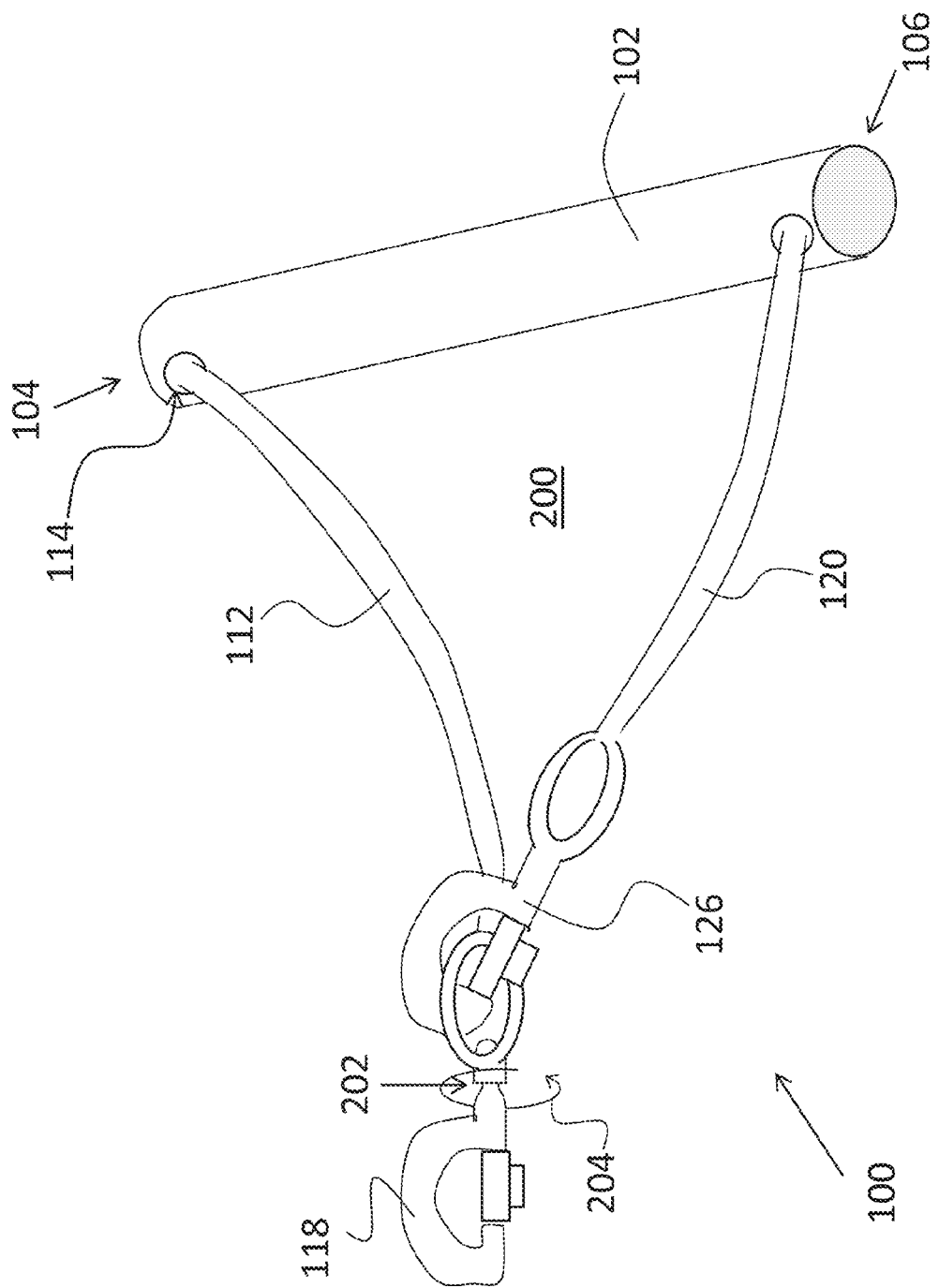
FIG. 2 is a perspective view of the dog leash assembly of FIG. 1 with the first and second leash adapters removably coupled to each other in accordance with the present invention.

FIG. 2 provides a perspective view of the dog leash assembly 100, illustrating a single-point connection configuration of the assembly 100 where one or more dogs can be coupled to the dog leash assembly 100 at one of the first leash connector 118 and the second leash connector 126, when the leash connectors 118 and 126 are removably coupled to one another. As seen in FIG. 2, the first pliable leash adapter 112 and second pliable leash adapter 120 are removably coupled to each other via the first leash connector 118 and the second leash connector 126. Referring back to FIG. 1, in one embodiment of the present invention, at least the first leash connector 118 is a clasp having two open areas 134a and 134b allowing for one area 134b to serve as a connector for the second leash connector 126 as illustrated in FIG. 2 and another area 134a to be removably couplable to other collar coupler members as described below. In one embodiment, the first leash connector 118 and second leash connector 126 are clasps as shown in FIGS. 1 and 2. In other embodiments, said leash connectors are in the form of lobster claws, S-hooks, carabineers, or other clasping mechanisms.

As shown in FIG. 2, the dog leash assembly 100 has the first pliable leash adapter 112 and second pliable leash adapter 120 removably coupled to each in order to form a triangular shape 200. While said leash connectors are removably coupled to each other, the user may connect a variety of leash attachments, or collar coupling members, depending on the size and strength of the dog. In order to selectively control a dog on one side, e.g., 104, of the handle portion 102 to the exclusion of a dog attached to the other side, e.g., 106, of the handle portion 102, the leash adapters 112, 120 are uncoupled from each other and additional leash attachments can be used.

To facilitate the handling of dogs while the leash adapters 112, 120 are coupled to each other as shown in FIG. 2, the first leash connector 118 includes a portion 202 that is rotatable with respect to itself. The term "rotatable" is defined herein as having the ability to rotate independent of at least one other portion of itself, e.g., make a complete 360 degree rotation 204 in relation to the area 134b serving as a connector for a leash connector 126, as exemplified in FIG. 2. As such, one embodiment of the present invention allows a user to attach the first leash connector 118 to multiple collar coupling members, which in turn are connected to dogs. The rotational ability of the first leash connector can advantageously reduce the leash adapters' 112, 120 propensity to wrap around and tangle with each other. Moreover, even though only the first leash connector 118 is shown in FIG. 2 as being rotatable, other leash connectors can also be rotatable, such as the second leash connector 126, shown in FIG. 7.

Figure 3:
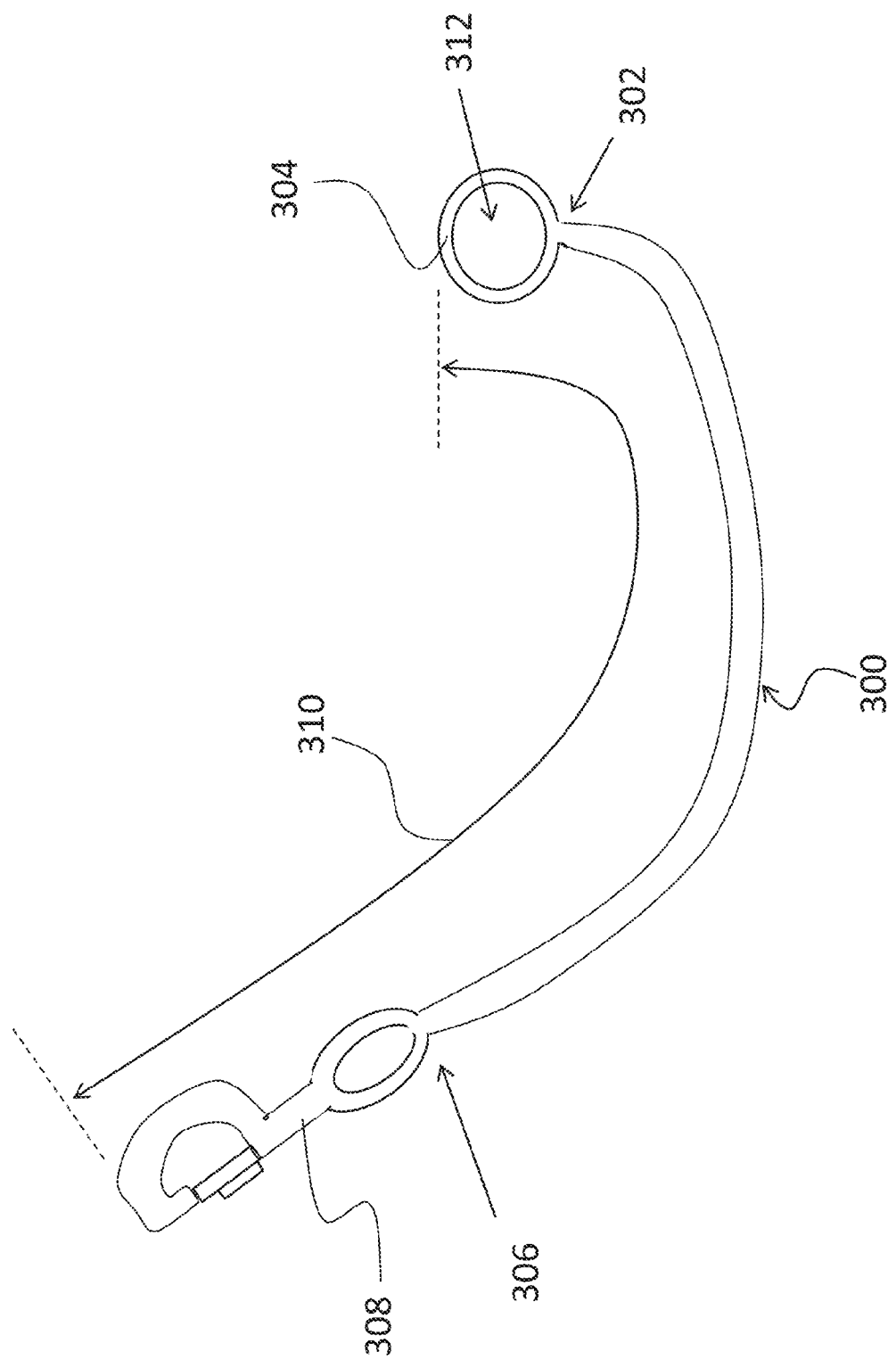
FIG. 3 is a top plan view of a collar coupling member in accordance with an exemplary embodiment of the present invention.

Referring now to FIG. 3, a first collar coupling member 300 is shown having a first end 302 with a first coupler 304 that is removably couplable to the first leash connector 118 and the second leash connector 126. In one embodiment, in order to provide a lightweight, strong material, but also flexible, the first collar coupling member 300 is made out of rope or chord. In other embodiments, the first collar coupling member 300 is made from plastic, nylon, leather, or other similar materials. Marine-grade rope has been found to be durable and possess an advantageously low frictional coefficient that allows assembly elements to easily slide for adjustment and avoid undesirable tangling when one or more dogs crosses the coupling member over itself or other coupling members.

The number of dogs the user desires to connect to the collar coupling member 300 can dictate the number of collar coupling members 300 the user will need. The user can specify the number of collar coupling members 300 based upon the size and strength of the dog. In one embodiment, the first coupler 304 is a metal ring and is attached by wrapping the material of the first collar coupling member 300 around the ring. In other embodiments, the first coupler 304 may be made out of plastic, metal, or other resilient materials. The first coupler 304 may also come in the form of a clasp or other shape such that it provides an area 312 to be coupled with the first pliable leash adapter 112 and second pliable leash adapter 120. The first coupler 304 may also be connected to the first collar coupling member 300 using adhesives, epoxies, bolts, or fastening mechanisms.

Figure 4:
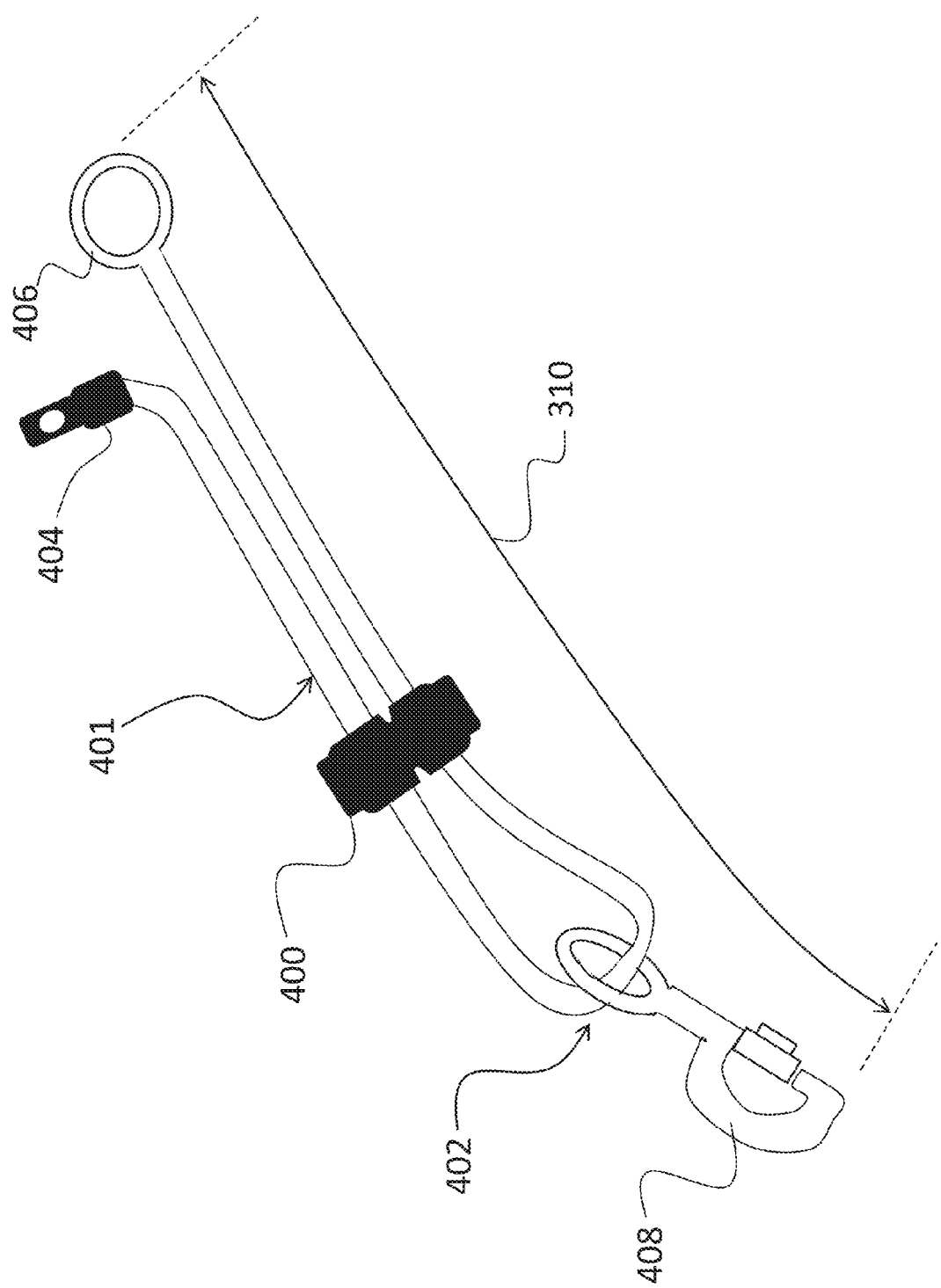
FIG. 4 is a top plan view of a collar coupling member with an adjustable length in accordance with an exemplary embodiment of the present invention.
Figure 5:
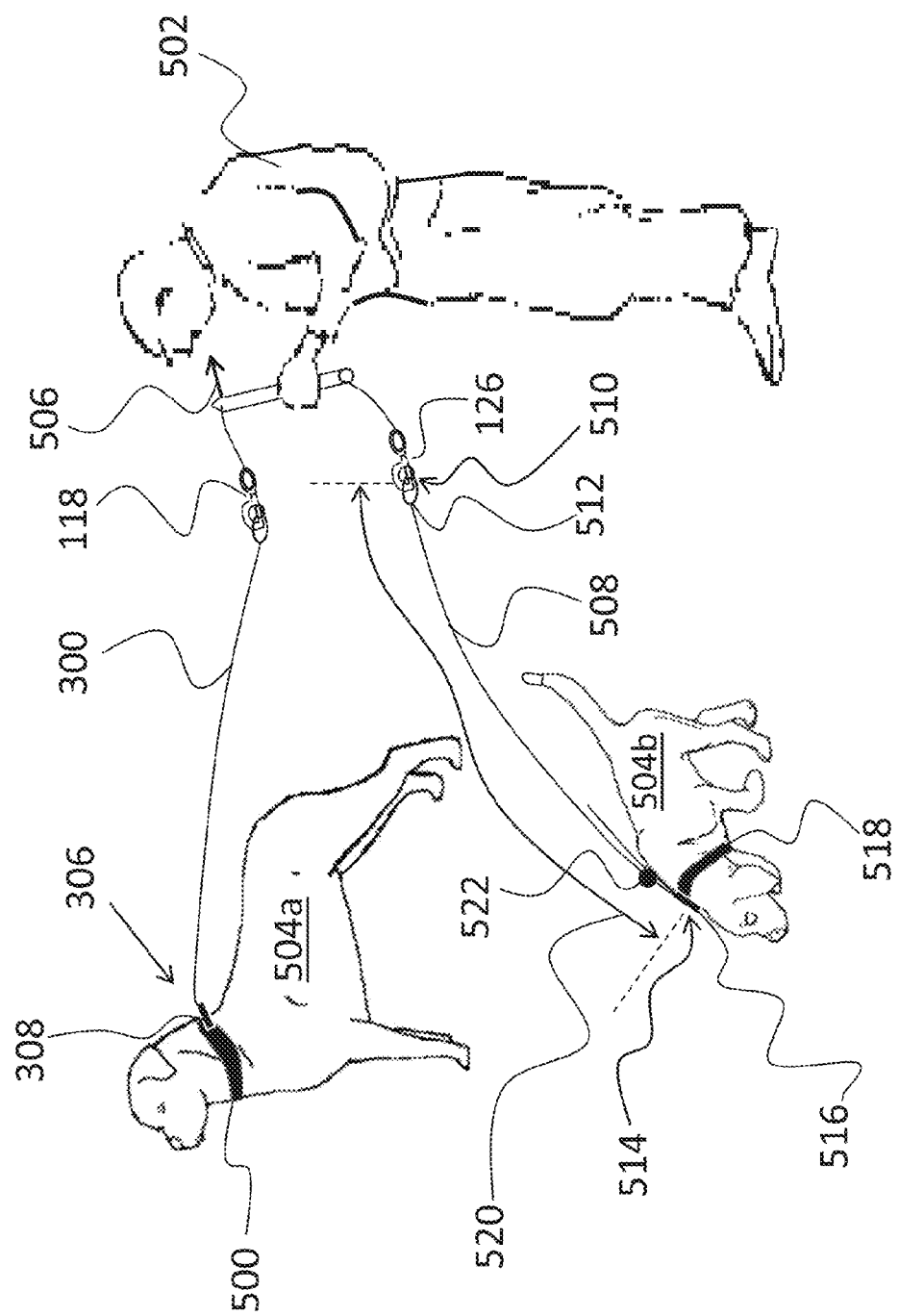
FIG. 5 is an elevational side view of a user holding the dog leash assembly of FIG. 1 with the collar coupling members of FIGS. 3 and 4 coupled thereto and to two dogs in accordance with any exemplary embodiment of the present invention.

The first collar coupling member 300 has a second end 306 with a first collar connector 308 attached that is removably couplable to a first dog collar 500, as shown in FIG. 5. In one embodiment, the first collar connector 308 is created using clasps as shown in FIG. 3. In other embodiments, said collar couplers are in the form of lobster claws, S-hooks, swiveling clasps, or other clasping mechanisms. The first coupler 304 and the first collar connector 308 are separated by a third length 310 that can be different from the first length 130 and second length 132. When used, the third length 310 separates the first pliable leash adapter 112 (or the second pliable leash adapter 120) from the dog collar 500. In one embodiment of the present invention, a plurality of first collar coupling members 300 can be provided, each with a different third length 130 to provide the user with options for how far the dog can move away from the user. In other embodiments, the third length 130 can be selectively defined by the user, as shown in FIG. 4 below.

FIG. 4 shows an additional exemplary embodiment of a collar coupling member that can form part of the of the dog leash assembly 100. In this embodiment, an adjustable length collar coupling member 401 allows the user to select a length, e.g., the third length 310, depending on the size and strength of the dog. The third length 310 can be selectively defined by the user simply by depressing a portion of toggle adjuster 400 disposed along the adjustable collar coupling member 401. In one embodiment, the toggle adjuster 400 engages with two portions of the collar coupling member 401. The user can simply press a portion of the toggle adjuster 400, which releases one portion of the collar coupling member 401 and allows it to slide relative to the other portion of the collar coupling member 401 to achieve the desired length. In other embodiments, there may be two independent toggle adjusters 400 on each piece of the collar coupling member 401 and a ring holding the two pieces of the collar coupling member 401 together, allowing the toggle adjusters 400 to be moved and define the third length 310.

As shown in FIG. 4, a collar connector 408 is opposite a collar coupler 406. The third length 310 between the collar connector 408 and the collar coupler 406 can vary depending on where the toggle adjuster 400 is positioned. In one embodiment, and in order to prevent the toggle adjuster 400 from disengaging with the first collar coupling member 401, an eyelet end fitting 404 is attached thereto. The eyelet end fitting 404 also has the ability to attach to the first leash connector 118 or the second leash connector 126, as desired. In other embodiments, the first collar coupling member will have another collar coupler 406 attached thereto, as discussed below.

FIG. 5 illustrates a user 502 using the dog leash assembly 100 to control two dogs 504a and 504b in a dual-point connection configuration of the assembly 100 where one or more dogs can be coupled to the first leash connector 118 and one or more dogs can be coupled to the second leash connector 126, when the leash connectors 118 and 126 are uncoupled to one another. As shown, at the distal end 306 of the first collar coupling member 300 is the first collar connector 308. The first collar connector 308 is shown here removably coupled to a first dog collar 500. For those users that have more than one dog and, in particular, users wishing to communicate correction signals to only one of at least two dogs coupled to the leash assembly 100, the presently inventive dog leash assembly 100 allows the user 502 to selectively deliver a correction to the first dog 504a and not the second dog 504b by tilting the elongated handle portion in a direction 506 away from the dog that needs correction, as indicated by the arrow in FIG. 5.

The second collar coupling member 508, as illustrated, is to be used as an additional feature with the dog leash assembly 100. The second collar coupling member 508 has a first end 510 that has a second coupling member 512 removably couplable to the second leash connector 126. The second collar coupling member 508 has a second end 514 with a second collar coupler 516 that is removably couplable to a second dog collar 518. So that the user may operate different dogs of different sizes the second collar coupling member 508 has a fourth length 520 separating the first end 510 and second end 514, with the fourth length 520 being different from the third length 310. As dogs have different sizes and walking habits, e.g., some are disciplined while others tend to run away despite contrary instructions from the master, different size leashes, or collar coupling members, are beneficial.

Advantageously, the present invention provides the user with a virtually limitless number of configurations of the dog leash assembly 100. For example, the collar coupling members 300, 401, 508, and many others with similar characteristics, which can all be of different lengths, can be attached to the handle portion 102 to provide any number of dogs any number of different lead distances from the handle portion 102. In addition, the collar coupling members 300, 401, 508, and others with similar characteristics, can be provided in varying strengths to account for the anticipated forces applied by dogs based on their size/strength/behavioral habits. For example, the first collar coupling member 300 shown in FIG. 5 can be of a first tensile strength that is appropriate for the first dog 504a, while the second collar coupling member 508 can be of a second tensile strength that is appropriate for the second dog 504h, which is probably less than that needed for the bigger dog 504a.

FIG. 5 also shows that the second collar coupling member 508 features an adjustable toggle adjuster 522 to selectively define the fourth length 520. The toggle adjuster provides an alternative to the fourth length 520 being a specific pre-defined length. In one embodiment, the material of the second collar coupling member 508 is made out of rope or chord. In other embodiments, the second collar coupling member 300 is made from plastic, nylon, leather, or other flexible materials.

Figure 6:
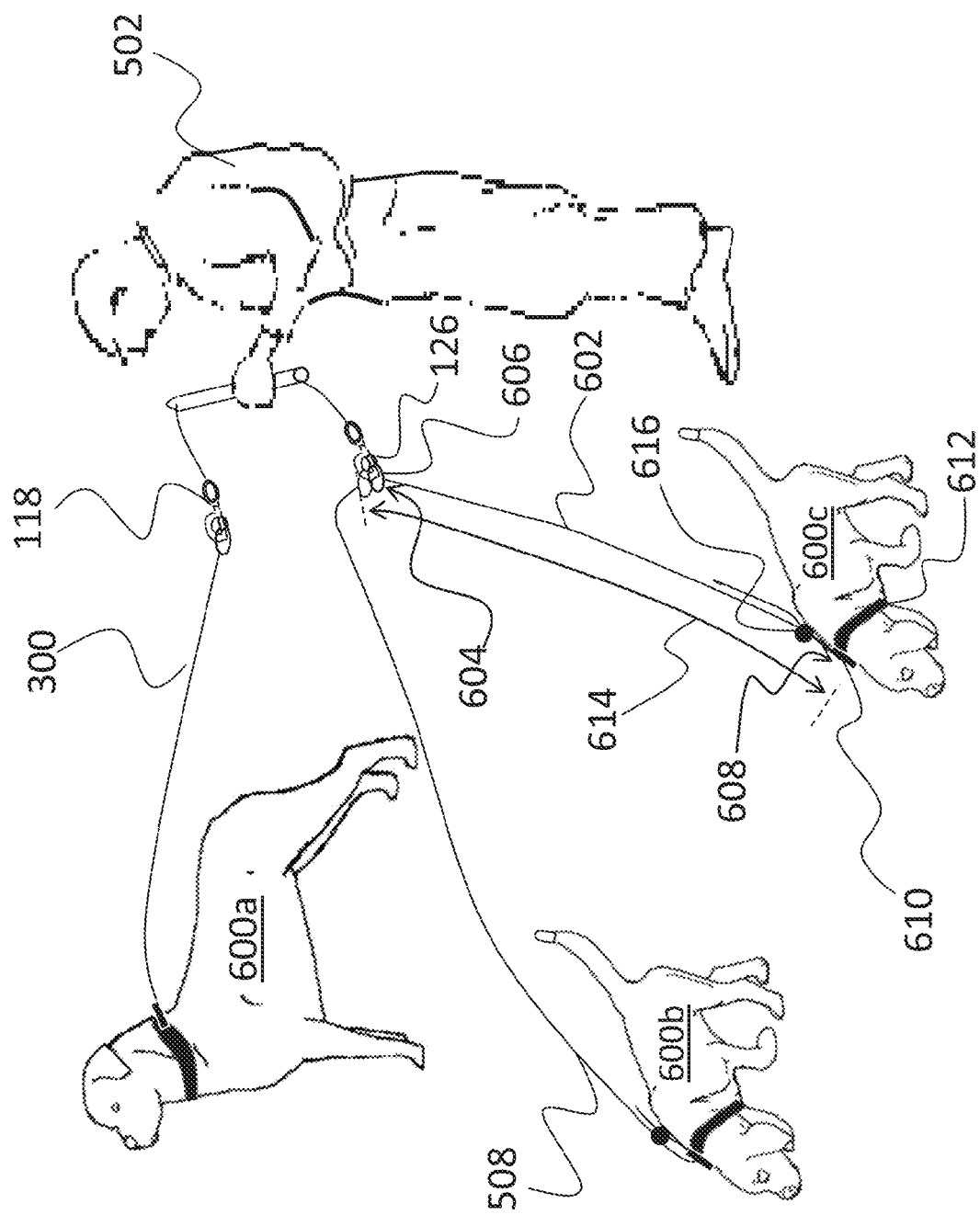
FIG. 6 is an elevational side view of a user holding the dog leash assembly of FIG. 1 with the collar coupling members of FIGS. 3 and 4 coupled thereto and to three dogs in accordance with any exemplary embodiment of the present invention.

FIG. 6 illustrates an additional feature of the dog leash assembly 100. FIG. 6 displays a third collar coupling member 602 having a first end 604 with a third coupling member 606 being removably couplable to the second leash connector 126. The third collar coupling member 602 also has a second end 608 with a third collar coupler 610 that is removably couplable to a third dog collar 612. The first end 604 and second end 608 is separated by a fifth length 614, where the fifth length 614 can be different from lengths of the other collar coupling members. The provision of coupling members having varying lengths allows the user 502 to select from a variety of lengths depending on the size or strength of the dog.

FIG. 6 shows the user 502 controlling three dogs 600a-c, with one dog connected at the first leash connector 118 and two dogs connected at the second leash connector 126. The third collar coupling member 602 is available in either predefined lengths or selectively defined lengths using a third toggle adjuster 616. In one embodiment, the material of the third collar coupling member 602 is made out of rope or chord. In other embodiments, the third collar coupling member 602 is made from plastic, nylon, leather, or other materials. Moreover, the third collar coupling member 602 and third collar coupler 610 have the same embodiments, as far as material and method of attachment, as the first collar coupling member 300 and first collar connector 308, respectively.

Figure 7:
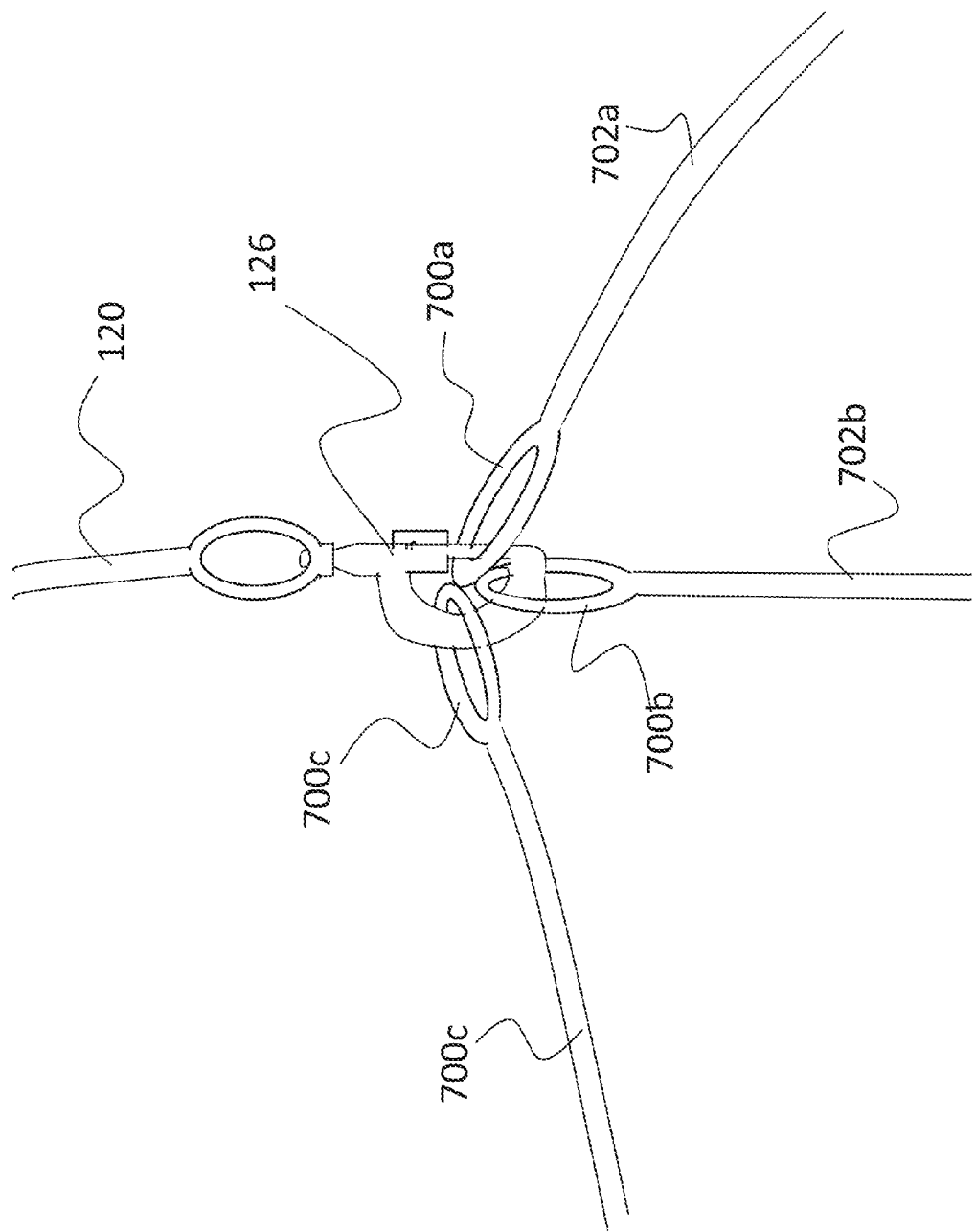
FIG. 7 is a fragmentary, elevational view of a leash connector of a second pliable leash adapter coupled to three couplers of three collar coupling members in accordance with the present invention.

Another embodiment of the present invention is shown in FIG. 7. FIG. 7 illustrates an example of a leash connector, specifically the second leash connector 126, having three coupling members 700a-c and collar coupling members 702a-c attached. In one embodiment of the present invention, the leash connector 126 may have four or more collar coupling members 702a-c attached. In other embodiments, the user 502 may desire to control more than four dogs on each leash connector, such that a user would attach more collar coupling members 700a-c on a collar coupler, such as the first collar coupler shown in FIG. 3. This easy and efficient way of coupling multiple leashes, while at the same time correcting certain dogs on one side of the dog leash assembly 100, allows the user 502 to connect numerous and a variety of different leash combinations.

Figure 8:
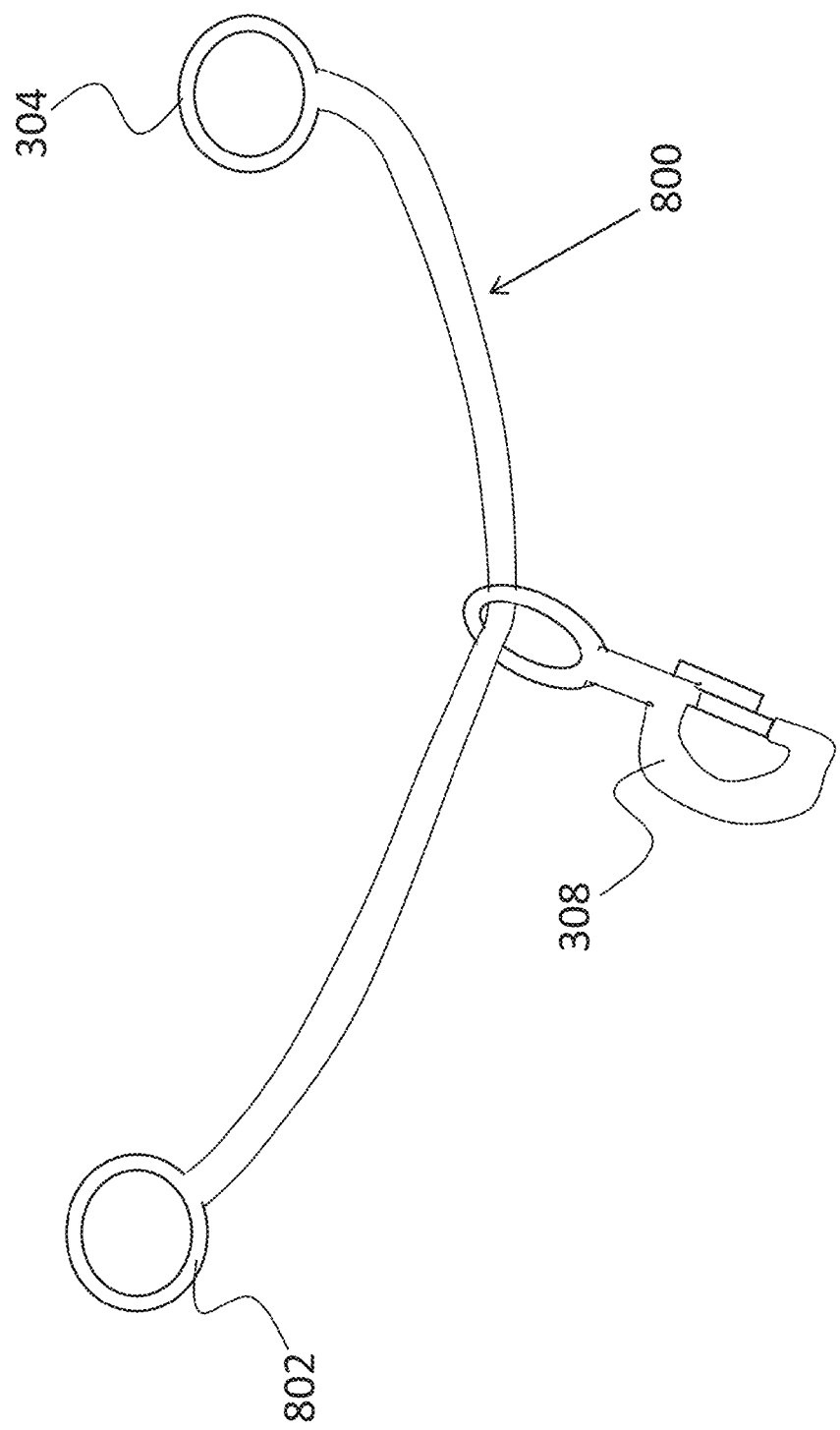
FIG. 8 is a top plan view of a collar coupling member in accordance with an exemplary embodiment of the present invention.

FIG. 8 illustrates a further embodiment of the present invention. An additional variation of the first collar coupling member 800 has the first collar connector 308 disposed between the first coupler 304 and a fastening coupler 802. Similar to the embodiment shown in FIG. 4, this variation of the collar coupling member 800 allows a user to attach the first coupler 304 to the leash adapters 112, 120, and gives the user also the option of coupling the fastening coupler 802 to the leash adapters 112, 120. Having the first collar connector 308 with the ability to slide along the collar coupling member 800 and disposed between the two couplers 304, 802, provides the user with a leash having the ability to withstand a higher tensile strength when both couplers 304, 802 are attached to either of the leash adapters 112, 120. As a result the user can advantageously attach larger and stronger dogs. Then, the user may quickly and efficiently disconnect one of the couplers 304, 802, and then conveniently vary the length by attaching toggle adjusters, as discussed above, when attaching smaller and weaker dogs to the collar connector 308.

A dog leash and method of coupling dogs to the leash has been disclosed that features an elongated handle having two pliable leash adapters disposed for the attachment of numerous collar coupling members, thereby providing an almost unlimited number of leash lengths, strengths, and configurations. Other features of the invention have been disclosed that add to the further versatility and are not intended to be limited to the particular details disclosed herein.

What is claimed is:

1. A dog leash comprising:
an elongated handle portion:
having a first end and a second end, opposite to the first end, and
a handle length separating the first end and the second end, the handle length defining an unobstructed palm receiving gripping surface extending from the first end to the second end and shaped to be gripped within the palm of a user's hand against the gripping surface on all sides thereof and at any point along the length thereof and operable to control one or more dogs coupled to the dog leash;
a first leash adapter having:
a first end coupled to the first end of the elongated handle portion;
a second end;
a first length separating the first end and the second end of the first leash adapter; and
a first leash connector at the second end of the first leash adapter;
a second leash adapter having:
a first end coupled to the second end of the elongated handle portion;
a second end;
a second length separating the first end and the second end of the second leash adapter; and
a second leash connector at the second end of the second leash adapter, the second leash connector being removably couplable to the first leash connector; and
a first collar coupling member having:
a first end with a first coupler being removably couplable to at least one of the first leash connector and the second leash connector;
a second end with a first collar connector that is removably couplable to a first dog collar; and
a third length separating the first end from the second end of the first collar coupling member;
wherein the handle length is substantially centered between the first end of the first leash adapter and the first end of the second leash adapter.

2. The dog leash according to claim 1, further comprising:
a second collar coupling member having:
a first end with a second coupler being removably couplable to at least one of the first leash connector and the second leash connector;
a second end with a second collar connector that is removably couplable to a second dog collar; and
a fourth length separating the first end from the second end of the second collar coupling member, the fourth length being different from the third length.

3. The dog leash according to claim 2, further comprising:
a third collar coupling member having:
a first end with a third coupler being removably couplable to the first leash connector and the second leash connector;
a second end with a third collar connector that is removably couplable to a third dog collar; and
a fifth length separating the first end from the second end of the third collar coupling member, the fifth length being different from at least one of the third and the fourth length.

4. The dog leash according to claim 1, wherein:
the first end of the elongated handle portion is separated from the second end of the elongated handle portion by at least three inches.

5. The dog leash according to claim 1, wherein:
the elongated handle portion, the first leash adapter, and the second leash adapter together form a triangular shape when the second leash connector is removably coupled to the first leash connector.

6. The dog leash according to claim 1, wherein the first collar coupling member further comprises:
a toggle adjuster disposed along and able to selectively define the third length.

7. The dog leash according to claim 1, wherein:
the first leash connector includes a first portion and a second portion, where the first portion is rotatable with respect to the second portion.

8. The dog leash according to claim 1, wherein:
the first length of the first leash adapter is different from the second length of the second leash adapter.

9. The dog leash according to claim 1, wherein:
the first collar connector is disposed between the first coupler and a fastening coupler, the fastening coupler being removably couplable to at least one of the first leash connector and second leash adapters.

10. Method of coupling a dog to a leash handle, the method comprising:
providing:
an elongated handle portion having a first end and a second end opposite to the first end, and
a handle length separating the first end and the second end, the handle length defining an unobstructed palm receiving gripping surface extending from the first end to the second end and shaped to be gripped within the palm of a user's hand against the gripping surface on all sides thereof and at any point along the length thereof and operable to control one or more dogs coupled to the dog leash;
a first leash adapter having:
a first end coupled to the first end of the elongated handle portion; a second end;

a first length separating the first end and the second end of the first leash adapter; and
a first leash connector at the second end of the first leash adapter; a second leash adapter having:
a first end coupled to the second end of the elongated handle portion; a second end;
a second length separating the first end and the second end of the second leash adapter, the second length being different from the first length; and
a second leash connector at the second end of the second leash adapter, the second leash connector being removably couplable to the first leash connector;
a first collar coupling member having:
a first end with a first collar coupler being removably couplable to at least one of the first leash connector and the second leash connector;
a second end with a first collar connector that is removably couplable to a first dog collar; and
a third length separating the first end from the second end of the first collar coupler; and
a second collar coupling member having:
a first end with a second coupler being removably couplable to at least one of the first leash connector and the second leash connector;
a second end with a second collar connector that is removably couplable to a second dog collar; and
a fourth length separating the first end from the second end of the second collar coupling member, the fourth length being different from the third length;
removably coupling the first leash connector to the second leash connector to form a single-point connection configuration;
removably coupling the first collar coupling member to the first leash connector;
disconnecting the second leash connector from the first leash connector to form a dual-point connection configuration; and
removably coupling the second collar coupling member to the second leash connector,
wherein the handle length is substantially centered between the first end of the first leash adapter and the first end of the second leash adapter.

11. The method according to claim 10, further comprising:
coupling a first dog to the first collar connector;
coupling a second dog to the second collar connector; and
selectively delivering a correction to only one of the first dog and the second dog by tilting the elongated handle portion.

12. The method according to claim 10, further comprising: providing:
   a third collar coupling member having:
      a first end with a third coupler being removably couplable to the first leash connector and the second leash connector;
      a second end with a third collar connector that is removably couplable to a third dog collar; and
      a fifth length separating the first end from the second end of the third collar coupling member, the fifth length being different from at least one of the third and the fourth length; and
coupling the third collar coupling member to one of the first leash connector and the second leash connector.

13. The method according to claim 10, wherein:
the first end of the elongated handle portion is separated from the second end of the elongated handle portion by at least three inches.

14. The method according to claim 10, further comprising:
forming a triangular shape by coupling the first leash adapter to the second leash adapter.

15. The method according to claim 10, further comprising:
selectively defining the third length by manipulating a toggle adjuster coupled to the first collar coupling member.

16. The method according to claim 10, wherein:
the elongated handle portion is tubular shaped.

17. A dog leash assembly, comprising:
an elongated handle portion:
having a first end and a second end, opposite to the first end, and
a handle length separating the first end and the second end, the handle length defining an unobstructed palm receiving gripping surface extending from the first end to the second end and shaped to be gripped within the palm of a user's hand against the gripping surface on all sides thereof and at any point along the length thereof and operable to control one or more dogs coupled to the dog leash;
a first pliable leash adapter having:
a first end coupled to the first end of the elongated handle portion;
a second end;
a first pre-defined length separating the first end and the second end of the first pliable leash adapter; and
a first leash connector at the second end of the first pliable leash adapter;
a second pliable leash adapter having:
a first end coupled to the second end of the elongated handle portion; a second end;
a second pre-defined length separating the first end and the second end of the second pliable leash adapter, the second pre-defined length being different from the first pre-defined length; and
a second leash connector at the second end of the second pliable leash adapter, the second leash connector being removably couplable to the first leash connector; and
a first collar coupling member having:
a first end with a first coupler being removably couplable to at least one of the first leash connector and the second leash connector;
a second end with a first collar connector that is removably couplable to a first dog collar; and
a third pre-defined length separating the first end from the second end of the first collar coupling member,
wherein the handle length is substantially centered between the first end of the first leash adapter and the first end of the second leash adapter.

18. The dog leash assembly according to claim 17, wherein:
the elongated handle portion, the first leash adapter, and the second leash adapter together form a triangular shape when the second leash connector is removably coupled to the first leash connector.

19. The dog leash assembly according to claim 17, wherein:
the elongated handle portion is tubular shaped.

20. The dog leash assembly according to claim 17, wherein:
the first length of the first leash adapter is different from the second length of the second leash adapter.

* * * * *